(12) United States Patent
Pau

(10) Patent No.: US 11,378,810 B2
(45) Date of Patent: Jul. 5, 2022

(54) POLYGON X-PRISM FOR IMAGING AND DISPLAY APPLICATIONS

(71) Applicant: Arizona Board of Regents on Behalf of the University of Arizona, Tucson, AZ (US)

(72) Inventor: Stanley Pau, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 16/982,522

(22) PCT Filed: Mar. 19, 2019

(86) PCT No.: PCT/US2019/022981
§ 371 (c)(1),
(2) Date: Sep. 18, 2020

(87) PCT Pub. No.: WO2019/183102
PCT Pub. Date: Sep. 26, 2019

(65) Prior Publication Data
US 2021/0026149 A1    Jan. 28, 2021

Related U.S. Application Data

(60) Provisional application No. 62/645,386, filed on Mar. 20, 2018.

(51) Int. Cl.
*G02B 27/14* (2006.01)
*G02B 27/12* (2006.01)
*G02F 1/133* (2006.01)

(52) U.S. Cl.
CPC ......... *G02B 27/141* (2013.01); *G02B 27/126* (2013.01); *G02B 27/149* (2013.01); *G02F 1/133* (2013.01)

(58) Field of Classification Search
CPC .... G02B 27/14; G02B 27/149; G02B 27/126; G02B 27/1006; G02B 27/1013; G02B 27/143; G02B 27/283
See application file for complete search history.

(56) References Cited

U.S. PATENT DOCUMENTS 5,245,472 A    9/1993  Hegg
5,880,889 A    3/1999  Neumann et al.
(Continued)

FOREIGN PATENT DOCUMENTS

FR          2643158 A1 *  8/1990  ........... G02B 27/149
WO    WO-2005114987 A1 * 12/2005  ........... F41G 7/2246

OTHER PUBLICATIONS

Tu, Xingzhou et al., "Design, fabrication and testing of achromatic elliptical polarizer", Optics Express, vol. 25, No. 9, pp. 10355-10367, May 2017 (13 pages).
(Continued)

*Primary Examiner* — Ryan D Howard
(74) *Attorney, Agent, or Firm* — Perkins Coie LLP

(57) ABSTRACT

Different configurations of multi-faceted optical elements and associated methods are described that split an input optical beam into multiple output beams, and in a reverse configuration, combine a set of input beams into an output beam. One example multi-faceted optical element includes K optical facets, where K is greater than or equal to six, and K-2 internal surfaces. Each internal surface reflects at least a portion of the incident light and includes a coating designed to modify one or more of a spectral content, polarization, intensity or phase of the incident beam. The multifaceted optical element is configurable to either split an input light beam into four or more output light beams, or to combine four or more input light beams into a single output light beam. Such a multi-faceted optical element can be
(Continued)

implemented as part of, for example, a display system, a multi-spectral camera or a polarization camera.

18 Claims, 6 Drawing Sheets

(56) References Cited

U.S. PATENT DOCUMENTS

| | | | |
|---|---|---|---|
| 7,710,630 | B2 | 5/2010 | Roth |
| 2003/0011752 | A1* | 1/2003 | Ikeda ................ H04N 9/3105 353/31 |
| 2005/0168697 | A1 | 8/2005 | Bruzzone et al. |
| 2005/0174543 | A1 | 8/2005 | Bin et al. |
| 2005/0185143 | A1 | 8/2005 | Bossche et al. |
| 2006/0114420 | A1 | 6/2006 | Kim et al. |
| 2010/0149533 | A1 | 6/2010 | Fest |
| 2014/0300718 | A1 | 10/2014 | Krattiger et al. |
| 2017/0075069 | A1 | 3/2017 | Martinelli |

OTHER PUBLICATIONS

Tu, Xingzhou et al., "Division of amplitude RGB full-Stokes camera using micro-polarizer arrays", Optics Express, vol. 25, No. 26, pp. 33160-33175, Dec. 2017 (16 pages).

International Search Report and Written Opinion dated Jun. 6, 2019 for International Patent Application No. PCT/US2019/022981, filed Mar. 19, 2019 (10 pages).

Hsu, Wei-Liang, et al., "Patterned cholesteric liquid crystal polymer film", J. Opt. Soc. Am. A, vol. 30, No. 2, pp. 252-258, Feb. 2013.

Hsu, Wei-Liang, et al., "Infrared liquid crystal polymer micropolarizer," AppL Opt., vol. 53, No. 23, pp. 5252-5258, Aug. 2014.

* cited by examiner

POLYGON X-PRISM FOR IMAGING AND DISPLAY APPLICATIONS

CROSS REFERENCE TO RELATED APPLICATIONS

This patent document is a 371 National Phase Application of International Patent Application No. PCT/US2019/022981, filed Mar. 19, 2019, which claims priority to the provisional application with Ser. No. 62/645,386, titled "POLYGON X-PRISM FOR IMAGING AND DISPLAY APPLICATIONS," filed Mar. 20, 2018. The entire contents of the above noted applications are incorporated by reference as part of the disclosure of this document.

TECHNICAL FIELD

The technology in this document generally relates to optical devices and specifically to beam splitters and beam combiners.

BACKGROUND

A beam splitter is an optical device that splits a beam of light in two or more output beams. A beam combiner, on the other hand, operates to combine multiple beams into one output beam (or generally to a fewer number of beams). Beam splitters and beam combiners are used in many optical devices, including interferometers, cameras and projection systems. While a beam splitter, in its most basic configuration, is used to split a single beam into two beams, in some applications, an incoming beam may need to be split into multiple output beams that, for example, have different spectral or polarization characteristics. Such multiplicity of output beams can be provided by a cascade arrangement of multiple beam splitter, where each beam splitter splits an incoming beam into two. In some applications, however, it may be desirable to use a single optical element to produce the multiple optical beams using a single optical element (or to combine multiple input beams into a single output beam when operated in a reverse configuration).

DETAILED DESCRIPTION

In this patent document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

The disclosed embodiments relate to configurations of multi-faceted optical elements and associated methods that can used to split an input optical beam into multiple output beams, and in a reverse configuration, to combine a set of input beams into an output beam. The disclosed technology can, for example, be implemented as part of a display system, a multi-spectral camera, a polarization camera and in many other applications that are disclosed herein.

In describing the disclosed technology, sometimes references are made to a prism configuration called a polygon x-prism which splits an incoming light beam into multiple beams with equal path length and different directions. Other designations of the x-prism include dichroic combiner cube, combiner cube, cross dichroic prism, and x-cube prism.

Figure 1A:
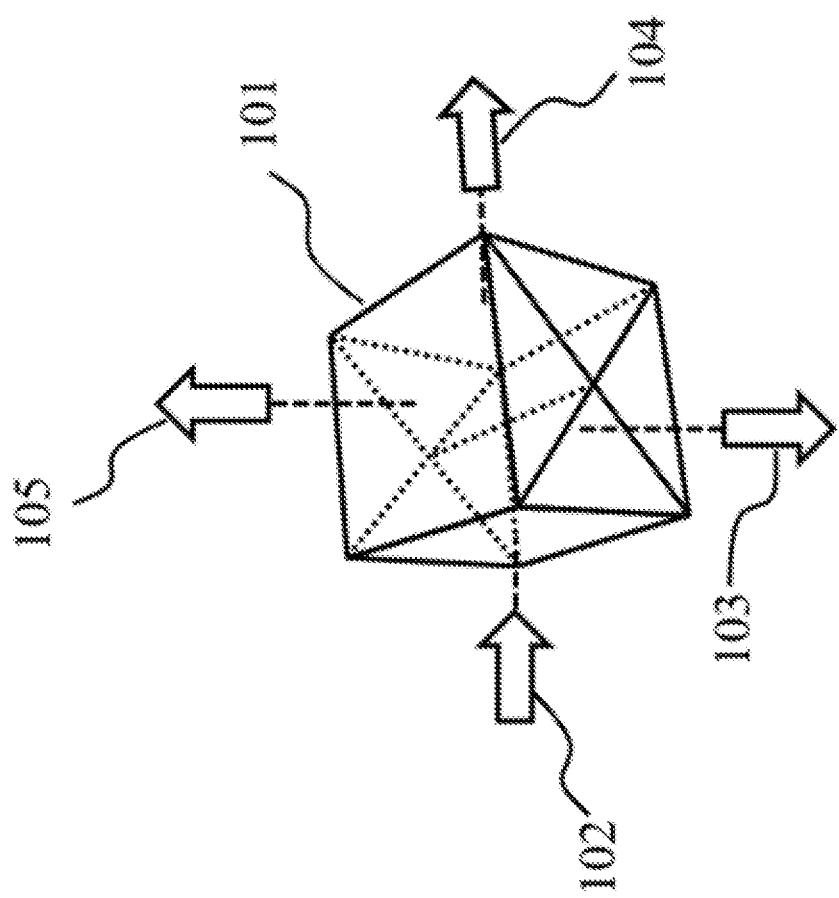
FIG. 1(a) illustrates a three-dimensional (3D) view of an x-prism.
Figure 1B:
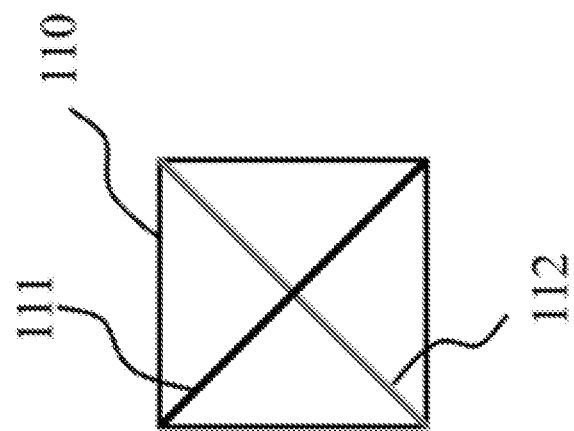
FIG. 1(b) illustrates a top view of the x-prism of FIG. 1(a).

A conventional x-prism splits an incoming light beam into three beams with equal path lengths and different directions. When operated in reverse, the x-prism acts as a combiner that combines three light beams of different directions into one beam with equal path length. FIG. 1(a) shows a three-dimensional (3D) view of an x-prism 101. The depicted cube x-prism has a shape of a cube and can be viewed as having four triangular prisms of equal dimensions. Incoming light beam 102 is split into three exiting beams, namely beam 103 having a downward direction, beam 104 with direction to the right, and beam 105 with an upward direction. One feature of the x-prism is its compact size and equal path length, such that the output beams travel the same distance and have the same transverse profile. Without the same path length, the different output beams may require additional optics or delay paths to compensate for the change in path length and transverse profile. FIG. 1(b) shows a top view of the x-prism of FIG. 1(a), depicting two sets of coatings 111 and 112. For example, in a display application, the coating is usually a dichroic color coating that reflects and transmits light of different colors, i.e., the coatings act as a color filter. For polarization imaging and interferometry applications, the coatings can act as polarizers that reflect and transmit different polarization states.

Figure 2:
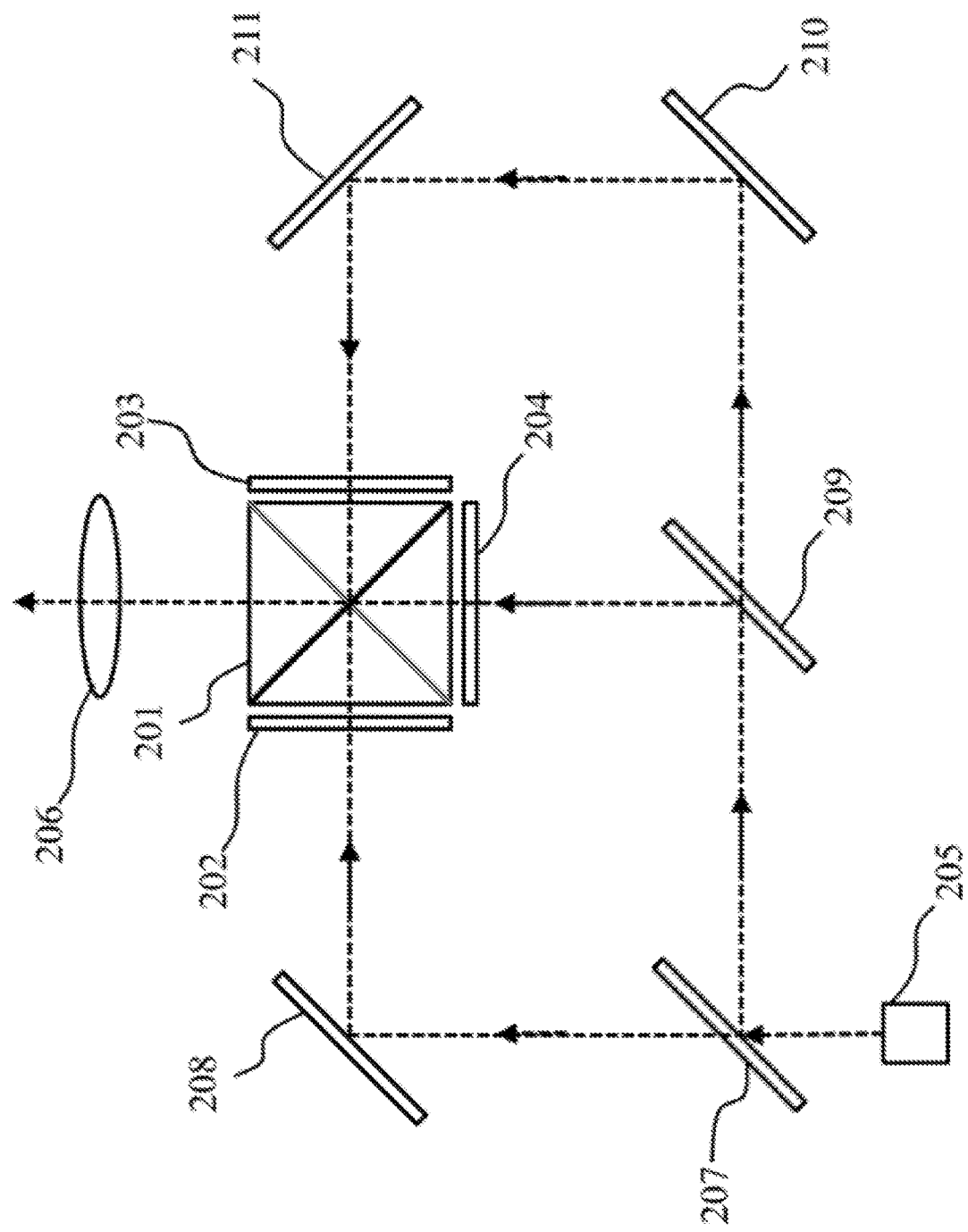
FIG. 2 illustrates a diagram of a projection system that uses an x-prism in conjunction with liquid crystal display (LCD) technology.

One application of the x-prism is a color projector system that uses liquid crystal displays (LCDs), as shown in FIG. 2. The key component of the projector is the x-prism 201 and three liquid crystal displays, 202, 203 and 204, operating in transmission mode. A white light source, 205, outputs a beam of light that is incident on a red dichroic mirror, 207, which splits the red light and directs it to a mirror, 208, and to the LCD, 202. The remaining light, including the blue and green light, is directed by the dichroic mirror, 207, to a blue dichroic mirror, 209, and is split by the blue dichroic mirror, 209; the blue light is directed to a second LCD, 204; the final component of the light (which excludes the blue and red components) is transmitted through the dichroic mirror, 209, is incident on a wavelength selector dichroic mirror, 210, and to another mirror, 211, which redirects the light to a third LCD, 203, that controls the green component of the display. Each of the LCDs (202, 204 and 206) can be controlled to modulate different colored lights that are transmitted through the LCDs and reach the x-prism, where they are combined and directed to a projector lens, 206. The output projected image has three color components with intensities that can be controlled independently by the three LCDs.

As evident from the examples of FIGS. 1(*a*), 1(*b*), a conventional x-prism splits an incoming light beam into three components (as evident from FIG. 2, the x-prism can also combine three incoming beams into single light beam). In some applications, however, it is beneficial to split an incoming light into more than three components using a passive optical element that has a compact form factor. For example, a division-of-amplitude camera may utilize more than three components of light with different colors and polarization states. One example of such a camera is described in X. Tu, O. J. Spires, X. Tian, N. Brock, R. Liang, S. Pau, "Division of amplitude RGB full-Stokes camera using micro-polarizer, arrays," Optics Express 25, 33160, 2017, which is incorporated by reference. In another example, a projection system can utilize four or more components of light having different colors and/or polarizations, as described, for example, in U.S. Pat. No. 7,710,630, which is incorporated by reference.

Figure 3B:
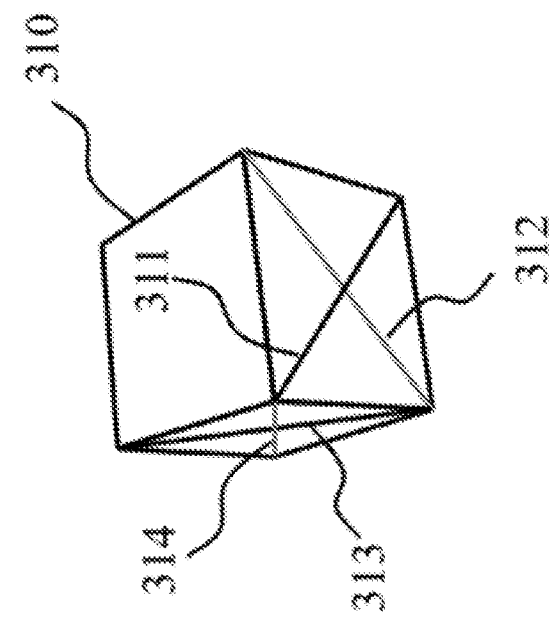
FIG. 3(b) is another view of the double x-prism of FIG. 3(a) illustrating the internal surfaces of the double x-prism.
Figure 3A:
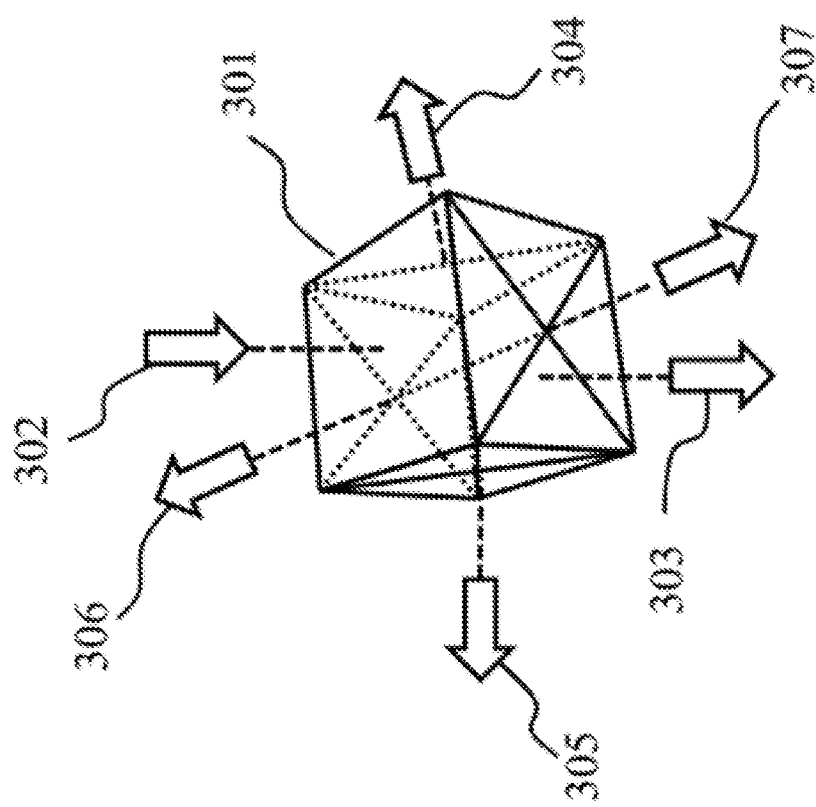
FIG. 3(a) illustrates a double x-prism that can produce five output beams in accordance with an exemplary embodiment.

According to one embodiment of the present application, more than three output facets of a six-facet cube are used to produce multiple output beams from a single input beam. In particular, by including additional optical interfaces inside the cube, all six facets can be used: one facet as the input and five facets as outputs. FIGS. 3(*a*) and 3(*b*) illustrate a double x-prism that can produce five output beams in accordance with an exemplary embodiment. The depicted double x-prism 301 is made of fourteen triangular prisms. An incident beam, 302, is split into five exit beams 303, 304, 305, 306 and 307. Beams 304, 305, 306 and 307 are reflected by the different facets of the triangular prisms inside the cube, and beam 303 is transmitted through the double x-prism. The symmetry of the double x-prism ensures that each of the five output beams has an equal optical path length. The depicted double x-prism has four primary coatings on four internal reflecting surfaces, 311, 312, 313 and 314, as shown in FIG. 3(*b*). Depending on the application, each coating can be a dichroic color coating, a semi-transparent metallic mirror, a multi-layer dielectric interference coating, a polarizer coating, a birefringent material coating, an anti-reflection coating, an index-matching coating, an absorptive coating, a liquid crystal polymer coating, a retarder coating, a magneto-optical coating or combination of some or all of the above. The thickness of the coatings can, for example, range from 0.1 micron to tens of microns. Each coating can be designed to have a particular reflectance, transmittance, phase and/or polarization characteristic. As such, the spectral, phase, intensity and/or polarization characteristics of the light that is output from each facet can be controlled based on the coatings, as well as the properties of the input light. In some implementations, due to imperfections or variations of the coatings or surfaces, the intensities of output beams can be different from one another. To address this issue, the filters (or coatings) can be designed to account for such differences so that the intensities of the output beams are made equal. Additionally, or alternatively, the differences in intensities, if need to be equalized, can be compensated via software post processing after the system has been calibrated. As will be discussed below, additional filters and/or coatings can be implemented at each of the output facets to provide yet another mechanism for controlling the characteristics of the output light from each facet.

In some embodiments, by using index-matching materials and by minimizing the thickness of the coating, the internal reflecting surfaces (e.g., the four primary facets in a double x-prism) can be made invisible to the incident light beam, i.e., the optical loss and scattering can be minimized. Moreover, in some applications, the effects of image artifacts that are produced due to unwanted reflections from any of the internal surfaces can be mitigated by positioning the reflecting surfaces (e.g., the entire double x-prism) in the larger optical system such that the image artifacts are defocused. Additionally, or alternatively, image artifacts can be removed post capture, via, for example, software image processing techniques.

Figure 4B:
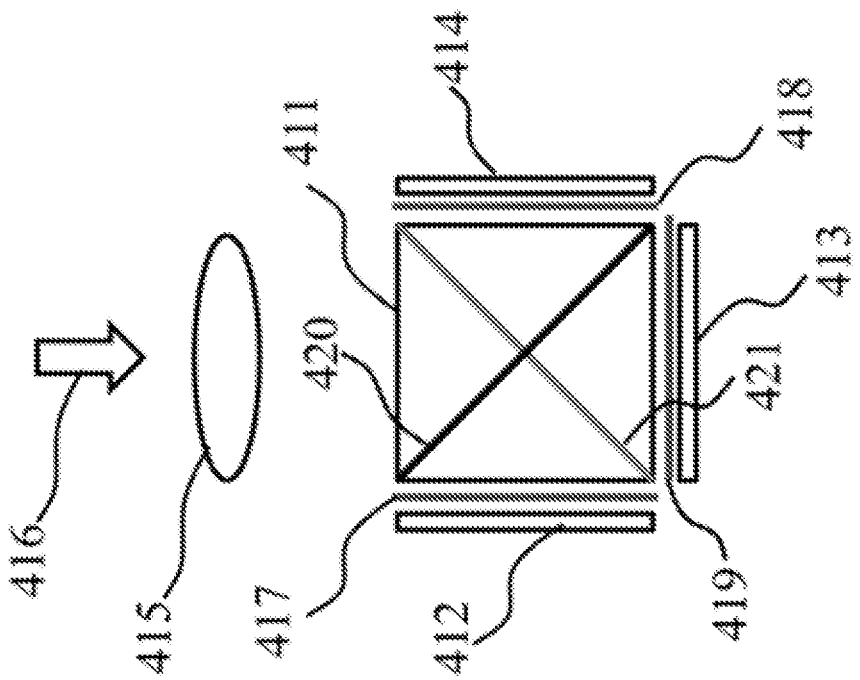
FIG. 4(b) shows a configuration of an example imaging polarimeter.
Figure 4A:
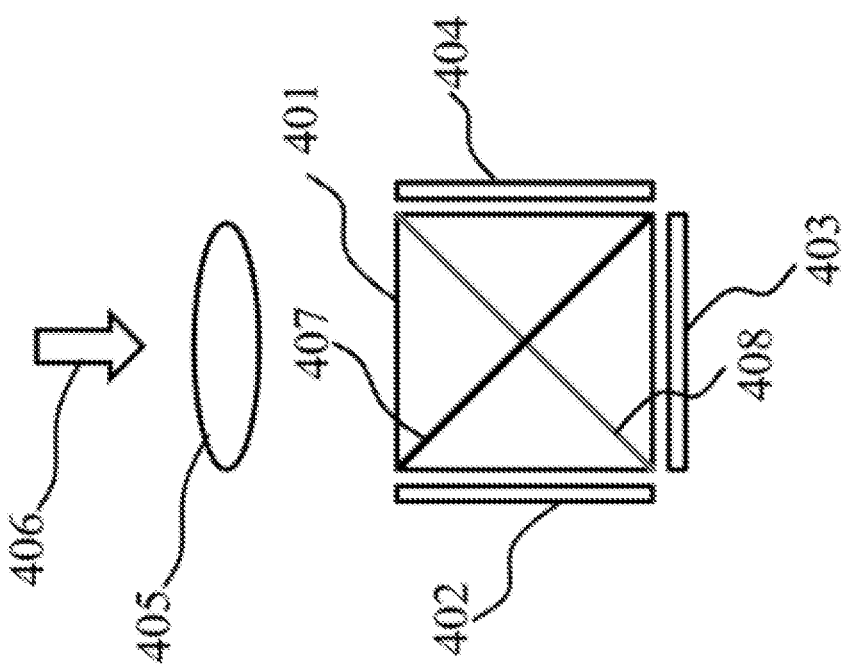
FIG. 4(a) shows a configuration of an example full spectrum camera.

FIG. 4(*a*) shows a configuration of a conventional full spectrum camera. The electronics and power supply for the camera are omitted for simplicity and only the lens, the prism and the focal plane arrays are shown. A full spectrum camera is a multi-spectral camera that captures the ultraviolet (UV), visible and short wave near infrared (SWIR) light. Such a camera utilizes the full range of spectral sensitivity of the detector, such as a silicon focal plane array. In FIG. 4(*a*), incoming light, 406, passes through an imaging lens, 405, onto an x-prism, 401. UV light is reflected by a dichroic coating, 408, and is incident on the focal plane array detector, 402. The SWIR light is reflected by a dichroic coating, 407, and is incident on the focal plane array detector, 404. The remaining visible light is transmitted to the focal plane array detector, 403. All the focal plane arrays can have the same number of pixels with identical dimensions. Focal plane array detector, 402, may be implemented without microlenses and/or a Bayer filter to maximize the detection of the UV light. Focal plane array detector, 404, may be implemented without a Bayer filter to maximize the detection of the SWIR light. Focal plane array detector, 403, may have a Bayer filter to measure the red, green and blue components of the visible light.

For many applications, the lens 405 must be designed to have very little chromatic aberration over the operating wavelengths. This can be difficult and expensive, especially for covering the entire UV, visible and SWIR bands. One solution is to vary the spacing between the focal plane array and the x-prism to compensate for the change in the focal length caused by chromatic aberration. For example, the spacings between the focal plane array detector, 402, and the x-prism, 401, and the x-prism, 401, and focal plane array detector, 404, can be different and controlled by application of a uniform spacer layer on top of the focal plane arrays. In accordance with some embodiments, the full spectrum camera may be adapted to partition the incoming light, 406, into more than three bands, such as different bands of UV, visible, SWIR, near infrared, mid-infrared, and long wave infrared bands. The number of bands can, for example, depend on the application and wavelength sensitivity of the focal plane array. For example, in one embodiment, a double x-prism, such as the one described in connection with FIGS. 3(*a*) and 3(*b*), can be used to divide the input light into 5 components, each component having a particular range of wavelengths. In one implementation, the improved full spectrum camera includes five focal plane array detectors, each positioned to receive an output beam existing one of the facets of the double x-prism.

FIG. 4(*b*) illustrates a configuration of an exemplary imaging polarimeter. An imaging polarimeter can measure the polarization state of the light of a scene. The polarization state can be described by a four-component Stokes vector, S. In the configuration of FIG. 4(b), incoming light, 416 passes through an imaging lens, 415, onto an x-prism, 411. Part of the incoming light is reflected by a broadband mirror coating, 421, and is incident on the focal plane array detector, 412, after passing through a polarizer filter, 417. Another part of the incoming light is reflected by a broadband mirror coating, 420, and is incident on the focal plane array detector, 414, after passing through a different polarizer filter, 418. The remaining light is transmitted through a third polarizer filter, 419, onto the focal plane array detector, 413. Measurement of the polarization state using the three focal plane arrays allows the reconstruction of the polarization image. In some configurations, internal coatings, 420 and 421, in FIG. 4(b) can be reflective polarizing filters, which reflect and transmit different polarization states. The external filters, 417, 418 and 419, can be color filters.

In some embodiments, the polarimeter of FIG. 4(b) can be modified to provide more than three output lights. For example, a double x-prism, such as the one discussed in connection with FIGS. 3(a) and 3(b), can be used to split the incoming light into more than three polarization states (e.g., two linearly polarized light, and two circularly polarized lights) and/or different colored light components. In one example, a double x-prism is used to split the incoming light into five components which are subsequently measured by five focal plane arrays each positioned to receive an output beam from one of the facets of the double x-prism. The components with different polarization, spectral, intensity and/or phase characteristics can be produced using the internal coatings only, or by a combination of internal coatings and external filters/coatings. For example, one camera design based on the x-prism can measure red linear polarized image, green circular polarized image and blue linear polarized image. The choice of the division, such as wavelength and polarization state, depends on the exact requirements of the application.

According to some embodiments, the double x-prism can also be utilized as part of a multi-color display projector. As noted earlier, in some applications, it may be beneficial to have more than three primary colors in order to increase the color space of the projector. A double x-prism can be used in a projector configuration (e.g., similar to the configuration of FIG. 2) to implement a display projector that has up to five primary colors. Moreover, the double x-prism can be utilized as a multi-polarization display projector. In some applications, such as interferometry and 3D imaging, it may be desirable to project an image with different polarization states, for example, circularly polarized light in certain pixel regions, linear polarized light in other pixel regions and elliptically polarized light in yet other pixel regions. In this application, a configuration similar to FIG. 2 can be implemented by selecting the appropriate color and polarization filters and coatings.

While the disclosed double x-prism has been presented to facilitate the understanding of the disclosed technology, in some embodiments, the optical combiner/splitter component can be generalized to include a higher number of facets. In particular, while a square has four equal sides, a hexagon can have six equal sides, an octagon can have eight equal sides and so on. In general, a polygon can be made to have 2N equal sides with N being an integer greater than or equal to 2.

Figure 5B:
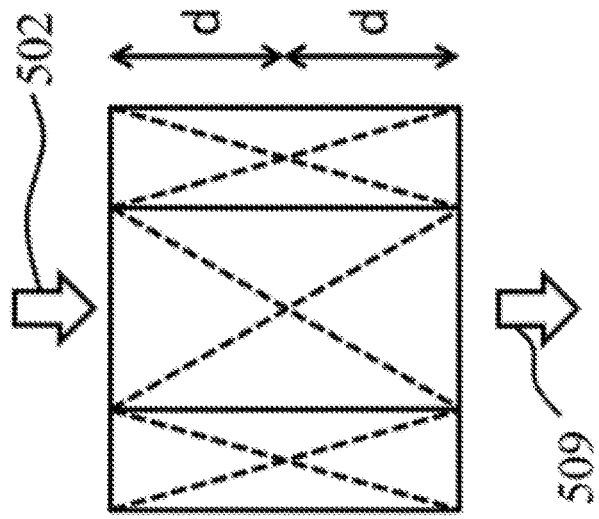
FIG. 5(b) illustrates an orthographic projection of the hexagon x-prism of FIG. 5(a).
Figure 5C:
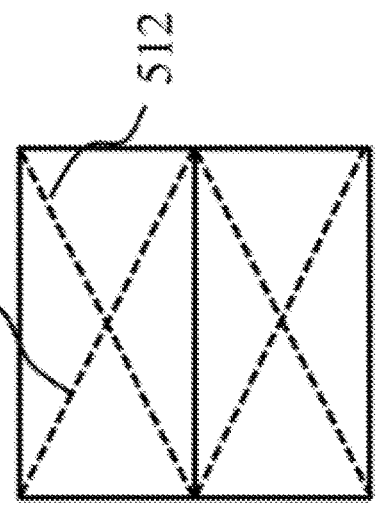
FIG. 5(c) illustrates another orthographic projection of the hexagon x-prism of FIG. 5(a).
Figure 5A:
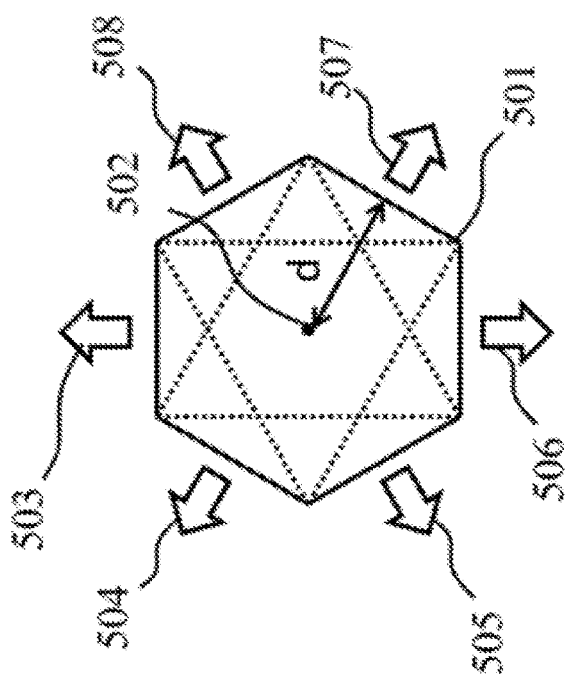
FIG. 5(a) illustrates a top view of a hexagon x-prism in accordance with an exemplary embodiment.

FIGS. 5(a) to 5(c) show different views of a beam splitter/beam combiner configuration corresponding to a hexagon x-prism in accordance with an exemplary embodiment. In the example hexagon x-prism of FIGS. 5(a) to 5(c), N is equal to 3. FIG. 5(a) shows the top view of an exemplary hexagon x-prism, 501. FIGS. 5(b) and 5(c) show orthographic projections of the hexagon x-prism of FIG. 5(a), with dotted lines depicting the internal reflecting surfaces of the hexagon. The distance from the center of the hexagon prism to the edge of the prism is denoted by d, and the height of the prism is 2d. An incoming light beam, 502, is normally incident on the prism (into the page in FIG. 5(a)) and is split into seven output beams. Six of the output beams, 503, 504, 505, 506, 507 and 508, exit through the sides of the hexagon x-prism. The seventh output beam, 509, passes through hexagon prism and exits through the bottom of the hexagon x-prism, without being reflected from the internal surfaces. The reflection of the output beam, 509, can be minimized by using appropriate coatings inside the hexagon x-prism. All seven outputs have equal path lengths by design. Two interfaces, 511 and 512, that act as reflectors can be seen in FIG. 5(c) for each of the side facets of the hexagon x-prism. It should be noted that in FIGS. 5(a) through 5(c), each dotted line depicts one internal reflective surface. These interfaces can include coatings as described earlier in this document.

Figure 6B:
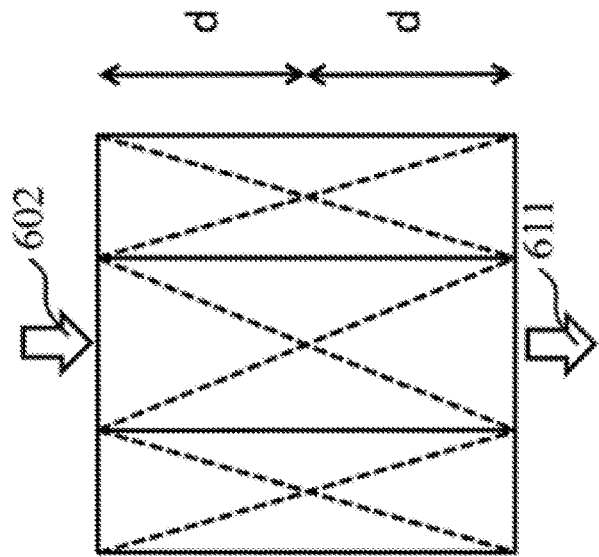
FIG. 6(b) illustrates an orthographic projection of the x-prism of FIG. 6(a).
Figure 6C:
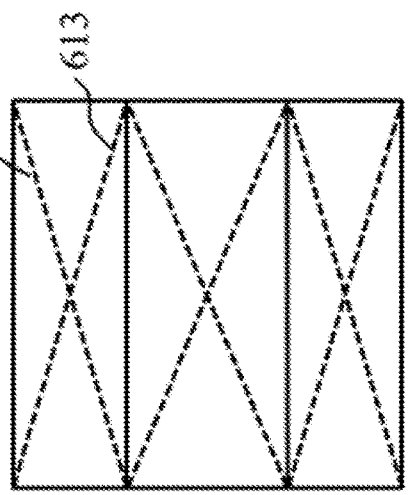
FIG. 6(c) illustrates another orthographic projection of the x-prism of FIG. 6(a).
Figure 6A:
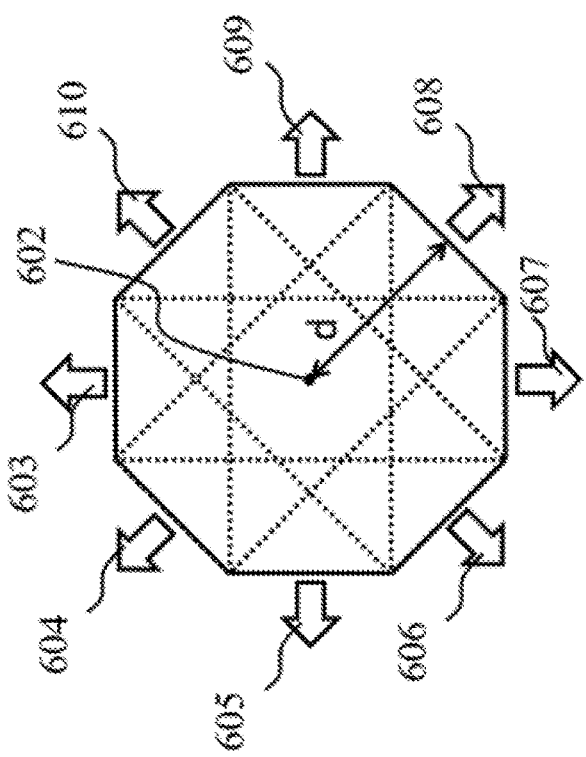
FIG. 6(a) illustrates a top view of an x-prism having ten facets in accordance with an exemplary embodiment.

FIGS. 6(a) to 6(c) show different views of a beam splitter configuration of an x-prism having ten facets in accordance with an exemplary embodiment. In the example of Similar to the convention used in FIGS. 5(a) to 5(c), FIG. 6(a) illustrates a top view of the multi-faceted x-prism, and FIGS. 6(b) and 6(c) illustrates associated orthographic projections thereof. In example x-prism of FIGS. 6(a) to 6(c), N is equal to 4. In particular, the input beam, 602, is incident on the top facet (into the page in FIG. 6(a)), and eight output beams, 603, 604, 605, 606, 607, 608, 609 and 610, are output from eight side facets. The ninth output beam, 611, is output from the bottom facet, as shown in FIG. 6(b). Two internal reflective surfaces, 613 and 614, are shown in FIG. 6(c). Each dotted line in FIGS. 6(a) to 6(c) represents one internal reflective surface.

While the above configurations were provided as illustrative examples, it should be noted that in accordance with the disclosed embodiments, in general, a three-dimensional multi-faceted optical element (e.g., a polyhedron) having K facets (K≥6) can be configured to include K-2 internal reflective surfaces and produce K-1 output beams from a single input beam that is incident on one of the facets. The reflective surfaces can include specially-designed coatings that allow the output beams to have particular spectral, phase, polarization and/or intensity characteristics. For example, in a polyhedron configuration, each of the K-2 side facets can have two interfaces, forming a cross, that operate as reflectors; K-2 beams are designed to exit the K-2 side facets and one beam passes through the bottom side of the optical element. The polyhedron can be designed to have a height that is equal to twice the distance between the center of the polyhedron to its edge, such that all beams have equal path lengths. For some applications which require different path lengths for the output beams, the dimensions of the polyhedron can be designed accordingly.

In some embodiments, multiple multi-faceted optical elements (e.g., polyhedrons) can be combined or cascaded to produce additional output beams. For example, with reference to FIG. 3(a), two double x-prisms can be combined such that an output beam of a first double x-prism is incident on the input facet of a second double x-prism, thus allowing a single input beam to be split into 9 output beams: four that exit the output facets of the first double x-prism and five that exit the output facets of the second double x-prism. In a similar fashion, a third, fourth, a fifth and a sixth x-prism can be added to the above configuration, each receiving one of the output beams of the first x-prism, and allowing a single input beam to be split into 25 output beams. If desired, additional x-prisms can be added to the above configuration to split one or more of the output beams into yet additional output beams, thus increasing the number of outputs even further. While the above configuration has been described to include double x-prisms, it is understood that any combination of the disclosed multi-faceted optical elements (e.g., the polyhedrons shown in FIGS. 5(a) to 5(c) and 6(a) to 6(c), or other multi-faceted elements) can be used in combination to produce the desired number of output beams. By providing the proper coatings at each of the internal reflective surfaces, output beams of desired spectral, phase, polarization and/or intensity characteristics can be produced. It should be also noted that the same configurations can be used in reverse to combine a larger number of beams that are incident on each polyhedron into a smaller number of output beams (or a single beam).

It should be further noted that the terms x-prism, polyhedron and polygon are sometimes used interchangeably herein to convey a multi-faceted optical element having internal reflecting facets that allow a single input beam to enter the optical element, and be split into multiple output beams (specifically four or more output beams) that exit from different facets of the optical element. When used in a reverse configuration, such a multi-faceted optical element can be used to combine a number of input beams to a single output beam.

The disclosed optical elements provide numerous features and benefits, including but not limited to, their ability to split a single beam into multiple beams (or combine multiple beams to a single beam) using a compact structure, without a need for active components, thus enabling many applications that are power, weight and space sensitive. The disclosed optical elements provide an easily scalable optical system that allows an increase in the number of output beams (or input beams, when used in a reverse configuration) by combining (e.g., stacking or placing side-by-side) two or more multi-faceted optical components. Moreover, the disclosed technology can be implemented in different optical systems with various applications, including but not limited to, metrology, remote sensing, inspection, display systems, full-spectrum cameras, autonomous vehicles, unmanned aerial vehicles (UAVs), dense wavelength division multiplexing (DWDM), telecommunications and others applications that can benefit from detecting or producing multiple light beams with different spatial, phase, polarization, or intensity characteristics.

One aspect of the disclosed embodiments relates to a multi-faceted optical element that includes K optical facets, where K is greater than or equal to six, and K-2 internal surfaces, where each internal surface is configured to reflect at least a portion of an optical beam that is incident thereupon. Each internal surface includes a coating designed to modify one or more of a spectral content, polarization, intensity or phase of the optical beam that is incident thereupon. The multifaceted optical element is configurable to either split an input light beam into four or more output light beams, or to combine four or more input light beams into a single output light beam. In some example embodiments, the multifaceted optical element is configured to split the input light beam into four or more output light beams of equal path lengths. In one exemplary embodiment, the multi-faceted optical element is configured to split the input light beam into at least five output light beams, and a first facet of the multi-faceted optical element is configured to receive the input light beam, and at least five additional facets of the multi-faceted optical element are each configured to allow one of the least five output light beams to exit the multi-faceted optical element.

According to one example embodiment, one or more of internal surfaces includes a coating that is designed to modify the spectral content of the beam that is incident thereupon to produce a reflected beam that includes as least one of the following spectral contents: an ultraviolet (UV) spectral content, a visible spectral content, a short wave near infrared (SWIR) spectral content, a near infrared spectral content, a mid-infrared spectral content, or a long wave infrared spectral content. In another example embodiment, one or more of the internal surfaces include a coating that is designed to modify the polarization of the beam incident thereupon to produce a reflected beam that includes as least one of a linearly polarized light, an elliptically polarized light, or a circularly polarized light.

In another example embodiment, the multi-faceted optical element further comprises an index-matched layer or material disposed upon one or more internal surfaces to eliminate or reduce an internal reflection within the multi-faceted optical element. For example, such an index-matched layer or material can improve an image quality of images captured or produced. In yet another example embodiment, the coating is one of: a dichroic color coating, a semi-transparent metallic mirror, a multi-layer dielectric interference coating, a polarizer coating, a birefringent material coating, an anti-reflection coating, an index-matching coating, an absorptive coating, a liquid crystal polymer coating, a retarder coating, a magneto-optical coating or combination thereof. In another example embodiment, the multifaceted optical element is configured to combine at least five input beams into the single output light beam, and a first facet of the multi-faceted optical element is configured to allow the single output light beam to exit the multi-faceted optical element and at least five additional facets of the multi-faceted optical element are configured to receive the at least five input beams.

Another example embodiment relates to a system that includes the above described multi-faceted optical element as a first multi-faceted optical element, the system further includes at least a second multi-faceted optical element, where the first multi-faceted optical element is coupled to the at least second multi-faceted optical element to receive the single output light beam that is output from the first multi-faceted optical element and to split the received output light beam into four or more additional output light beams.

In another example embodiment, the above described multi-faceted optical element is part of a projection system that includes a plurality of liquid crystal display (LCD) elements. In this example embodiment, the multi-faceted optical element is positioned within the projection system to receive light having a specific spectral characteristic from each of the LCD elements and to produce the single output light beam.

In yet another example embodiment, the above noted multi-faceted optical element is part of an optical detection system that includes a plurality of focal plane array detectors. In this example embodiment, the multi-faceted optical element is positioned to receive an input light on a first optical facet of the multi-faceted optical element, and each of the plurality of focal plane array detectors is positioned to receive light from an optical facet of the multi-faceted optical element other than the first optical facet. In one example embodiment, the optical detection system is a full spectrum camera. In another example embodiment, the optical detection system is a polarimeter that further includes a plurality of polarizer filters positioned between the plurality of focal plane array detectors and the respective optical facets of the multi-faceted optical element, where each polarizer filter is configured to modify a polarization state of light incident thereupon.

Another aspect of the disclosed embodiments relates to a polyhedron for use as an optical splitter that includes at least one input facet to receive an input light beam, at least five output facets, and at least four internal surfaces. Each internal surface includes a coating designed to modify one or more of a spectral content, a polarization, an intensity or a phase of light that is incident thereupon. The internal surfaces are positioned to allow at least a portion of the input light beam to reach one of the output facets upon transmission through the polyhedron and at least a portion of the input light beam to reach one or more of the remaining output facets upon full or partial reflection from one or more of the internal facets.

In one example embodiment, the polyhedron is a cube configured as a double x-prism, having one input facet, four internal surfaces and five output facets. In another example embodiment, the polyhedron has a hexagonal cross section, one input facet, six internal surfaces and seven output facets. In yet another example embodiment, the polyhedron has an octagonal cross section, one input facet, eight internal surfaces and nine output facets. In still another example embodiment, the polyhedron is configured to produce output beams having equal path lengths.

Another aspect of the disclosed embodiments relates to a polyhedron for use as an optical combiner that includes at least five input facets, where each input facet is arranged to receive an input light beam, one output facet, and at least four internal surfaces. Each internal surface includes a coating designed to allow each of the input beams to reach the output facet upon reflection from one or more of the internal facets, where the coatings are designed to allow one input light beam to reach the output facet upon transmission through the polyhedron, and the remaining input beams to reach the output facet upon reflection from one or more of the internal facets. In one example embodiment, a height of the polyhedron is twice a distance from a center of each facet to an edge that facet.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, and systems.

What is claimed is:

1. A multi-faceted optical element, comprising:
K optical facets, wherein K is greater than or equal to eight; and
no more than K-2 internal surfaces, each internal surface configured to reflect at least a portion of an optical beam that is incident thereupon, each internal surface including a coating designed to modify one or more of a spectral content, polarization, intensity or phase of the optical beam that is incident thereupon:
the multifaceted optical element is configurable to either split an input light beam into a plurality of output light beams, or to combine a plurality of input light beams into a single output light beam.

2. The multi-faceted optical element of claim 1, wherein the multifaceted optical element is configured to split the input light beam into six or more output light beams of equal path lengths.

3. The multi-faceted optical element of claim 1, wherein:
the multifaceted optical element is configured to split the input light beam into at least six output light beams, and
a first facet of the multi-faceted optical element is configured to receive the input light beam, and at least six additional facets of the multi-faceted optical element are each configured to allow one of the least six output light beams to exit the multi-faceted optical element.

4. The multi-faceted optical element of claim 1, wherein one or more of internal surfaces includes a coating that is designed to modify the spectral content of the beam that is incident thereupon to produce a reflected beam that includes as least one of the following spectral contents: an ultraviolet (UV) spectral content, a visible spectral content, a short wave near infrared (SWIR) spectral content, a near infrared spectral content, a mid-infrared spectral content, or a long wave infrared spectral content.

5. The multi-faceted optical element of claim 1, wherein one or more of the internal surfaces include a coating that is designed to modify the polarization of the beam incident thereupon to produce a reflected beam that includes as least one of a linearly polarized light, an elliptically polarized light, or a circularly polarized light.

6. The multi-faceted optical element of claim 1, further comprising an index-matched layer or material disposed upon one or more internal surfaces to eliminate or reduce an internal reflection within the multi-faceted optical element.

7. The multi-faceted optical element of claim 1, wherein the coating is one of: a dichroic color coating, a semi-transparent metallic mirror, a multi-layer dielectric interference coating, a polarizer coating, a birefringent material coating, an anti-reflection coating, an index-matching coating, an absorptive coating, a liquid crystal polymer coating, a retarder coating, a magneto-optical coating or combination thereof.

8. The multi-faceted optical element of claim 1, wherein:
the multifaceted optical element is configured to combine at least six input beams into the single output light beam, and
a first facet of the multi-faceted optical element is configured to allow the single output light beam to exit the multi-faceted optical element and at least six additional facets of the multi-faceted optical element are configured to receive the at least six input beams.

9. The multi-faceted optical element of claim 1, wherein the multi-faceted optical element is part of a projection system that includes a plurality of liquid crystal display (LCD) elements, and the multi-faceted optical element is positioned within the projection system to receive light having a specific spectral characteristic from each of the LCD elements and to produce the single output light beam.

10. The multi-faceted optical element of claim 1, wherein the multi-faceted optical element is part of an optical detection system that includes a plurality of focal plane array detectors, the multi-faceted optical element is positioned to receive an input light on a first facet of the multi-faceted optical element, and each of the plurality of focal plane array detectors is positioned to receive light from an optical facet of the multi-faceted optical element other than the first optical facet.

11. The multi-faceted optical element of claim 10, wherein the optical detection system is a full spectrum camera.

12. The multi-faceted optical element of claim 10, the optical detection system is a polarimeter that further includes a plurality of polarizer filters positioned between the plurality of focal plane array detectors and the respective optical facets of the multi-faceted optical element, wherein each polarizer filter is configured to modify a polarization state of light incident thereupon.

13. A system, comprising:
a first multi-faceted optical element that includes:
K optical facets, wherein K is greater than or equal to six, and
K-2 internal surfaces, each configured to reflect at least a portion of an optical beam that is incident thereupon, each internal surface including a coating designed to modify one or more of a spectral content, polarization, intensity or phase of the optical beam that is incident thereupon, wherein the first multifaceted optical element is configurable to either split an input light beam into four or more output light beams, or to combine four or more input light beams into a single output light beam, wherein:
the system further includes at least a second multi-faceted optical element, wherein the first multi-faceted optical element is coupled to the at least second multi-faceted optical element to receive the single output light beam that is output from the first multi-faceted optical element and to split the received output light beam into four or more additional output light beams.

14. A polyhedron for use as an optical splitter, comprising:
at least one input facet to receive an input light beam;
at least five output facets; and
at least four internal surfaces, each internal surface comprising a coating designed to modify one or more of a spectral content, a polarization, an intensity or a phase of light that is incident thereupon, wherein the internal surfaces are positioned to allow at least a portion of the input light beam to reach one of the output facets upon transmission through the polyhedron and at least a portion of the input light beam to reach one or more of the remaining output facets upon full or partial reflection from one or more of the internal facets, wherein the polyhedron has a hexagonal cross section, one input facet, six internal surfaces and seven output facets.

15. The polyhedron of claim 14, wherein the polyhedron is configured to produce output beams having equal path lengths.

16. The polyhedron of claim 14, wherein the polyhedron is configurable for use as an optical combiner to produce a single beam from a plurality of input beams.

17. A polyhedron for use as an optical splitter, comprising:
at least one input facet to receive an input light beam;
at least five output facets; and
at least four internal surfaces, each internal surface comprising a coating designed to modify one or more of a spectral content, a polarization, an intensity or a phase of light that is incident thereupon, wherein the internal surfaces are positioned to allow at least a portion of the input light beam to reach one of the output facets upon transmission through the polyhedron and at least a portion of the input light beam to reach one or more of the remaining output facets upon full or partial reflection from one or more of the internal facets, wherein the polyhedron has an octagonal cross section, one input facet, eight internal surfaces and nine output facets.

18. The polyhedron of claim 17, wherein the polyhedron is configurable for use as an optical combiner to produce a single beam from a plurality of input beams.

* * * * *